United States Patent
Liang (10) Patent No.: US 9,615,245 B2
(45) Date of Patent: Apr. 4, 2017

(54) METHOD AND DEVICE FOR PROCESSING CARRIER AGGREGATION CAPABILITY

(71) Applicant: China Academy of Telecommunications Technology, Beijing (CN)

(72) Inventor: Jing Liang, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 131 days.

(21) Appl. No.: 13/691,742

(22) Filed: Dec. 1, 2012

(65) Prior Publication Data

US 2013/0114508 A1   May 9, 2013

Related U.S. Application Data

(63) Continuation of application No. PCT/CN2011/078272, filed on Aug. 11, 2011.

(30) Foreign Application Priority Data

Aug. 13, 2010   (CN) .......................... 2010 1 0252872

(51) Int. Cl.
*H04W 8/24*   (2009.01)
*H04L 5/00*   (2006.01)
(Continued)

(52) U.S. Cl.
CPC .............. *H04W 8/24* (2013.01); *H04L 5/001* (2013.01); *H04L 5/0028* (2013.01);
(Continued)

(58) Field of Classification Search
CPC ........................................................ H04W 8/24
(Continued)

(56) References Cited

U.S. PATENT DOCUMENTS 8,675,583 B2 * 3/2014 Lee et al. ...................... 370/329
2010/0267394 A1 * 10/2010 Wu .............................. 455/450
(Continued)

FOREIGN PATENT DOCUMENTS

| CN | 101345988 A | 1/2009 |
|---|---|---|
| CN | 101873646 A | 10/2010 |

(Continued)

OTHER PUBLICATIONS

ISR for PCT/CN2011/078272 mailed on Nov. 3, 2011 and its English translation by WIPO.
(Continued)

*Primary Examiner* — Rasheed Gidado
(74) *Attorney, Agent, or Firm* — Ladas & Parry, LLP (57) ABSTRACT

The present invention relates to a method and device for processing carrier aggregation capability, which method comprises: sending, by user equipment, its own carrier aggregation capability to the network side; acquiring, by network side equipment, the carrier aggregation capability of the user equipment; and configuring, by the network side equipment, aggregated carriers for the user equipment according to the carrier aggregation capability thereof. In the present invention, the sending of the carrier aggregation capability to the network side by the UE enables the network side to acquire the UE's carrier aggregation capability, thus ensuring the normal operation of the carrier aggregation system.

13 Claims, 5 Drawing Sheets

(51) Int. Cl.
  *H04W 24/02* (2009.01)
  *H04W 28/18* (2009.01)
  *H04W 72/00* (2009.01)

(52) U.S. Cl.
  CPC .......... *H04L 5/0092* (2013.01); *H04L 5/0023* (2013.01); *H04W 24/02* (2013.01); *H04W 28/18* (2013.01); *H04W 72/00* (2013.01)

(58) Field of Classification Search
  USPC ...... 370/328, 329, 252, 330; 455/422.1, 450
  See application file for complete search history.

(56) References Cited

U.S. PATENT DOCUMENTS

| | | | |
|---|---|---|---|
| 2011/0319069 A1* | 12/2011 | Li | 455/422.1 |
| 2012/0282922 A1* | 11/2012 | Fodor et al. | 455/426.1 |

FOREIGN PATENT DOCUMENTS

| | | | |
|---|---|---|---|
| CN | 102823188 A | 12/2012 |
| JP | 2010136326 A | 6/2010 |
| WO | 2010/016222 A1 | 2/2010 |
| WO | 2010/016596 A1 | 2/2010 |
| WO | 2010/032675 A1 | 3/2010 |
| WO | 2011/019653 A1 | 2/2011 |
| WO | 2011/098124 A1 | 8/2011 |

OTHER PUBLICATIONS

Written Opinion for PCT/CN2011/078272 mailed on Nov. 3, 2011 and its English translation by WIPO.
IPRP Ch. 1 for PCT/CN2011/078272 issued on Feb. 19, 2013 and its English translation by WIPO.
Office Action for corresponding Chinese App No. 201010252872.9 mailed on Jun. 28, 2013 and its English translation.
Office Action for corresponding Chinese App No. 201010252872.9 mailed on Mar. 31, 2014 and its English translation.
Office Action for corresponding Japanese App No. 2013-519950 mailed on Dec. 17, 2013 and its English translation.
Office Action for corresponding Korean App No. 10-2012-7031272 mailed on Apr. 16, 2014 and its English translation.
Decision to Refuse a Patent for corresponding Korean App No. 10-2012-7031272 mailed on Jan. 28, 2015 and its English translation.
Guang, Xiangyuan et al: "Carrier Aggregation for LTE-advanced Advanced Mobile Communication Systems" IEEE Communications Magazine, vol. 48, issue: 2, Feb. 2010, pp. 88-93; figure 1.

* cited by examiner

METHOD AND DEVICE FOR PROCESSING CARRIER AGGREGATION CAPABILITY

CROSS REFERENCE TO RELATED APPLICATIONS

This application is a continuation of PCT/CN2011/078272 filed on Aug. 11, 2011, which claims priority to Chinese Patent Application No. 201010252872.9 entitled "Method and Device for Processing Carrier Aggregation Capability" filed in the Patent Office of the People's Republic of China on Aug. 13, 2010, the disclosures of which are hereby incorporated by reference in their entireties.

This application claims the priority to the Chinese Patent Application No. 201010252872.9 titled "Method and Device for Processing Carrier Aggregation Capability" filed to the Patent Office of the People's Republic of China on Aug. 13, 2010, the entire disclosure of which is incorporated by reference herein.

FIELD OF THE INVENTION

The present invention relates to the field of communication technology, in particular to the method and device for processing carrier aggregation capability.

BACKGROUND OF THE PRESENT INVENTION

Figure 1:
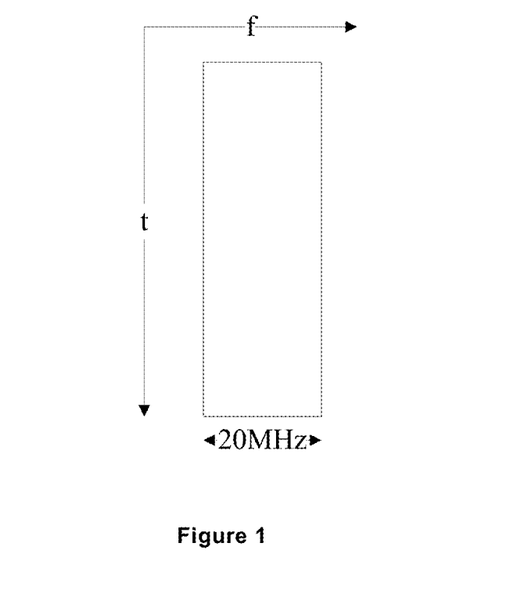
FIG. 1 is a schematic diagram of only one carrier in a cell in present technology LIE system.

LTE (Long Term Evolution) is the evolution of 3G (3rd Generation) and improves and enhances air access technology of 3G, and OFDM (Orthogonal Frequency Division Multiplexing) and MIMO (Multiple Input Multiple Output) are adopted as standard for wireless network evolution of this LTE. Therein, in LTE system and the previous wireless communication system, there is one carrier in a cell. As shown in FIG. 1, the maximum bandwidth in LTE system is 20 MHz. And under spectral bandwidth of 20 MHz, LTE can provide peak rate of 100 Mbit/s at downlink and 50 Mbit/s at uplink to improve the performance of cell edge user, increase cell capacity and decrease system delay. Besides, in LTE system, UE (User Equipment) can work under only one carrier, and there is only one carrier in a cell, so each LTE cell is identified by a unique number in the network.

Figure 2:
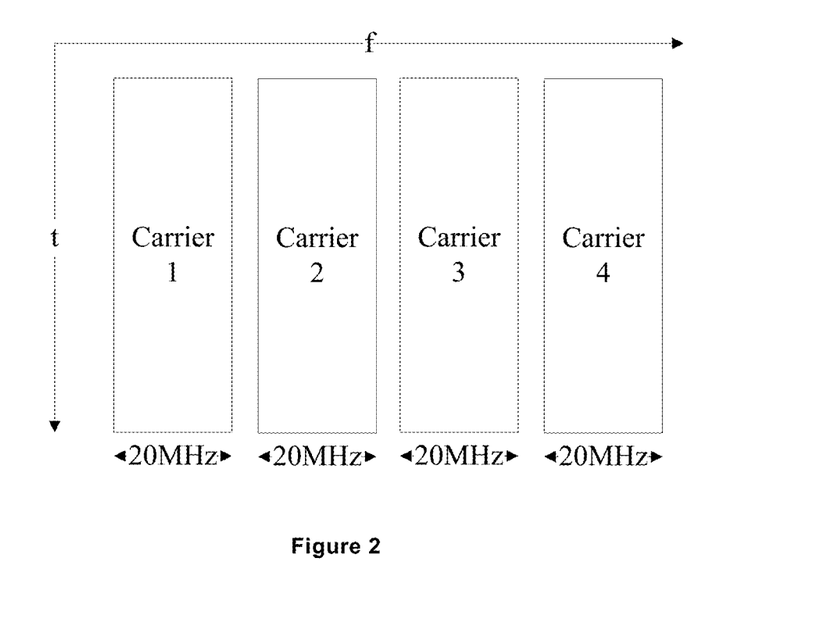
FIG. 2 is a schematic diagram of carrier aggregation technology in present technology LTE-A.

Along with the rapid increase in the quantity of mobile terminal users, the service capacity of terminal users increases exponentially. To meet the service demand of the increasing terminal users, it is necessary to provide a greater bandwidth to realize higher peak rate required for terminal users' service and application. In LTE-A (LTE Advanced) system, the peak rate is greatly improved compared with LTE, which is required to be 1 Gbps at downlink and 500 Mbps at uplink. In this case, only using the carrier with maximum bandwidth of 20 MHz can hardly achieve the requirements of peak rate. Therefore, LTE-A system needs to expand the bandwidth available to terminal user, thus the introduction of CA (Carrier Aggregation) technology, that is, aggregate several continuous or discontinuous carriers under the same eNB (evolved Node-B,) (aggregation is unavailable between cells or component carriers under different eNBs) and serve UE, so as to provide the required rate. These aggregated carriers are also called CC (Component Carrier). In addition, to ensure UE of LTE can be work under each aggregated carrier, each carrier for aggregation cannot exceed 20 MHz at most. FIG. 2 shows CA technology of LTE-A, where there are 4 carriers that can be aggregated under the eNB of LTE-A, and the eNB can perform data transmission on 4 carriers and UE simultaneously, to improve system throughput.

In course of implementing the present invention, the inventor finds out there are at least the problems below in the present technology:

In present technology, UE only works in the separate cell and only informs the network of band supported by it, instead of its carrier aggregation capability, thus the base station cannot configure carrier aggregation for UE in the carrier aggregation context.

SUMMARY OF THE INVENTION

The embodiments of the present invention provide a method and device for processing carrier aggregation (CA) capability to enable base stations to acquire the carrier aggregation capability of UE, thus ensuring normal operation of a carrier aggregation system.

To achieve the aforesaid objects, the embodiments of the present invention provide a method for processing carrier aggregation capability, comprising:

The user equipment sends its own carrier aggregation capability to the network side.

The embodiments of the present invention provide a method for processing carrier aggregation capability, comprising:

The equipment at network side acquires the carrier aggregation capability of the user equipment;

The network side equipment configures the aggregated carrier for the user equipment according to the carrier aggregation capability of the user equipment.

The embodiments of the present invention provide a user equipment, comprising:

A sending module is used for sending its own carrier aggregation capability to the network side.

The embodiments of the present invention provide a network side equipment, comprising:

An acquisition module is used for acquiring the carrier aggregation capability of the user equipment;

A configuration module is used for configuring the aggregated carriers for the user equipment according to the carrier aggregation capability of the user equipment.

Compared with the present technology the present invention at least has the following advantages:

Sending carrier aggregation capability to the network side through UE to make the network side acquire the carrier aggregation capability of UE, thus ensuring normal operation of a carrier aggregation system.

DETAILED DESCRIPTION OF PREFERRED EMBODIMENTS

When carrier aggregation (CA) technology is introduced into LTE-A system, UE can aggregate several cells and meanwhile serve them, including one primary cell and several secondary cells. Center frequency of several cells can be in the same band or different bands. And base station can configure different aggregation cell combinations for UE according to concrete situation of UE.

In current technology, UE only works in the separate cell and does not inform the network of its own carrier aggregation capability, thus the base station cannot configure carrier aggregation for UE. Accordingly the embodiments of the present invention provide a method and device for processing carrier aggregation (CA) capability to enable base stations to acquire the carrier aggregation capability of UE, thus ensuring normal operation of a carrier aggregation system. Related technology of UE carrier aggregation capability is described herein below.

(1) Carrier Aggregation Context

In LTE-A system, based on frequency adjacency relation among cells (component carrier) participating in aggregation, carrier aggregation can have two basic contexts, continuous component carrier aggregation and discontinuous component carrier aggregation. Therein, discontinuous carrier aggregation also can be classified into discontinuous component carrier aggregation in the same band and discontinuous component carrier aggregation in different bands.

Figure 3:
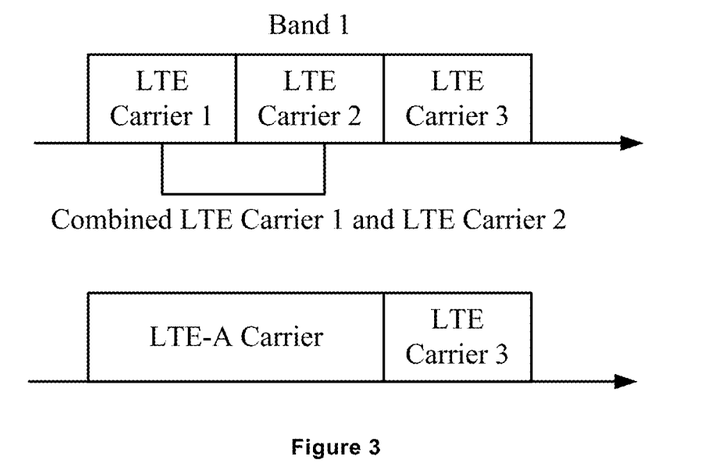
FIG. 3 is a schematic diagram of aggregation of continuous component carrier in the same band.
Figure 4:
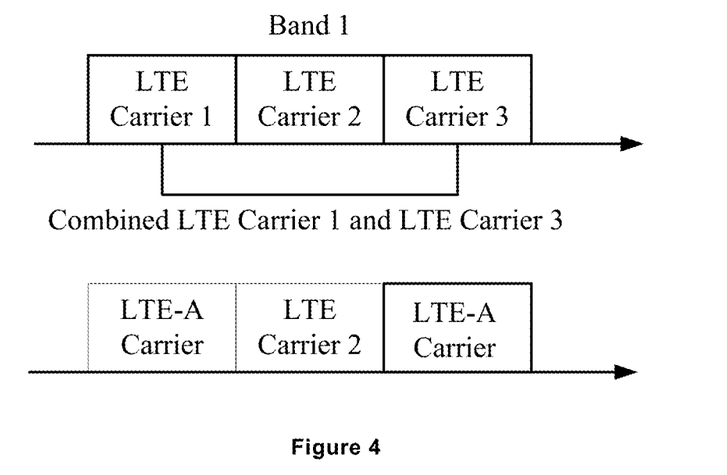
FIG. 4 is a schematic diagram of aggregation of discontinuous component carrier in the same band.
Figure 5:
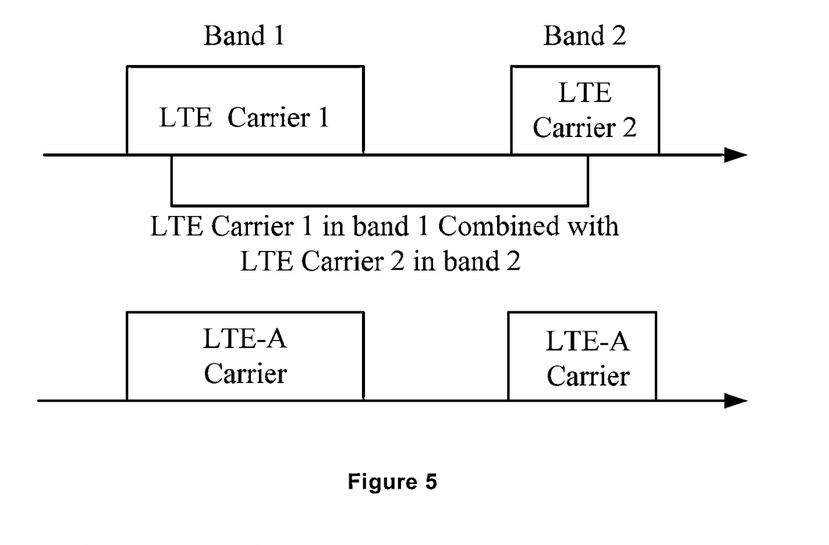
FIG. 5 is a schematic diagram of aggregation of discontinuous component carrier in different bands.

FIG. 3, FIG. 4 and FIG. 5 show the schematic diagram of continuous component carrier aggregation in the same band, that of discontinuous component carrier aggregation in the same band and that of discontinuous component carrier aggregation in different bands respectively.

Wherein, for discontinuous component carrier aggregation in the same band and discontinuous component carrier aggregation in different bands, UE (User Equipment) may be required to have several T/R channels in simultaneous service, thus higher requirement is raised for UE cost and power consumption.

In addition, the context can be divided into two categories according to band aggregation capability of UE, that is, inter-band (different bands) aggregation and intra-band (in the same band) aggregation. Therein, inter-band carrier aggregation is discontinuous carrier aggregation while intra-band aggregation can be either continuous carrier aggregation or discontinuous carrier aggregation.

It should be noted that, aggregation capability of UE differentiates the uplink and the downlink, which can be different. For example, in LTE-A system, FDD (Frequency Division Duplex) system supports intra-band and inter-band carrier aggregation at its downlink and supports only intra-band aggregation at its uplink, while TDD (Time Division Duplexing) system supports intra-band aggregation at both uplink and downlink.

(2) UE Radio Capabilities in LTE System

Among UE capabilities of LTE system, including supporting the bands and measuring whether gap needs to be measured for other bands when working at certain band, etc.

(3) Process of UE Capability Reporting of LTE System

Figure 6:
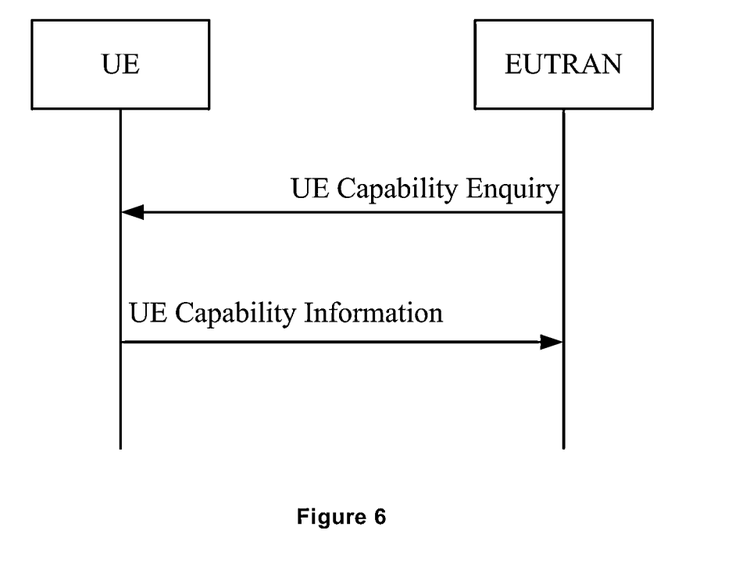
FIG. 6 is a schematic diagram of UE capability reporting procedure.

In LTE system, the process of UE capability reporting is shown in FIG. 6, including: the network side sends UE capability query message to UE and UE returns UE capability message to the network side.

Wherein, if the capability message of UE is not saved at the network side, this process will be used for querying UE capability and UE capability message will be acquired through UE reporting.

In addition, if UE capability message has been saved at the core network side but there is not such message in the base station, the base station can acquire this UE capability message directly from the core network without requesting UE again for querying capability message of this UE.

Then we will combine the attached drawings in the present invention to clearly and fully describe the technical proposals therein below. Obviously, the embodiments described are only a part of the embodiments of the present invention instead of the whole. Based on the embodiments of the present invention, all other embodiments acquired by ordinary technicians of this field on the premise of paying no creative work are within the protection of the present invention.

Figure 7:
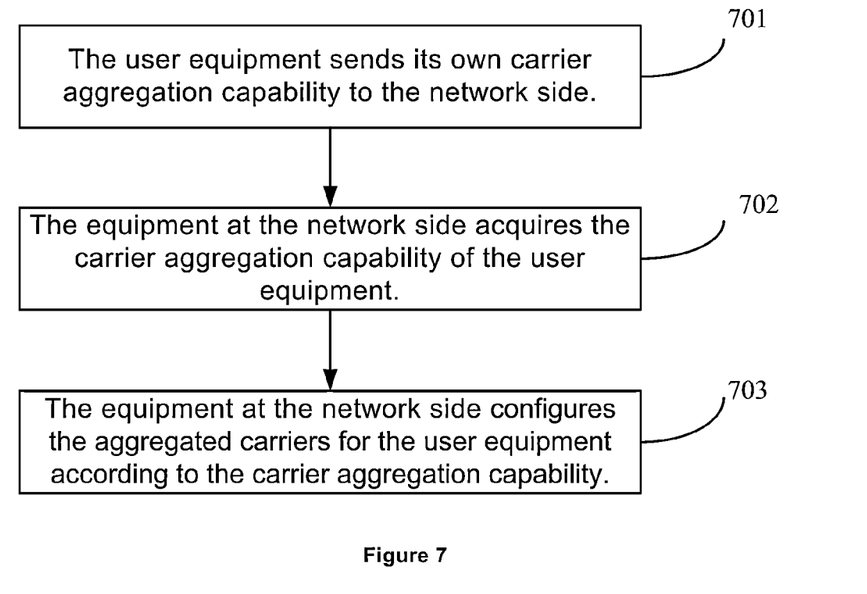
FIG. 7 is a flow diagram of a method for processing carrier aggregation capability provided in the embodiments of the present invention.

As shown in FIG. 7, the embodiment I of the present invention provides a method for processing carrier aggregation capability, comprising the following steps:

Step 701, the user equipment sends its own carrier aggregation capability to the network side.

The carrier aggregation capability comprises one of the following conditions or any combination: different aggregation bands supported; the aggregation bandwidth supported for continuous aggregation in the same band; the aggregation frequency supported for discontinuous aggregation in the same band; the number of the aggregated carriers supported; whether carrier aggregation among different bands and/or in the same band is supported.

The user equipment sends its own carrier aggregation capability to the network side, including: when the user equipment supports the carrier aggregation among different bands, the user equipment will send the carrier aggregation capability among different bands to the network side; when the user equipment supports the carrier aggregation in the same band, the user equipment will send the carrier aggregation capability in the same band to the network side; when the user equipment supports the carrier aggregation among different bands and in the same band, the user equipment will send the carrier aggregation capabilities among different bands and in the same band to the network side respectively; or the user equipment will send a combination of the carrier aggregation capabilities among different bands and in the same band to the network side.

In the embodiments of the present invention, different aggregation bands supported comprise one of the following conditions or any combination: whether inter-band carrier aggregation among bands is supported; which aggregation combination of inter-band is supported; bandwidth of inter-band carrier aggregation; carrier number of inter-band carrier aggregation.

The method for showing aggregation frequency supported for discontinuous aggregation in the same band comprises: the specific frequency; or, the scope of frequency; or, the maximum spacing of frequencies that can be aggregated.

For the aggregation in the same band, the number of the aggregated carriers supported comprises: the number of the aggregated carriers supported in each band;

For the aggregation among different bands, the number of the aggregated carriers supported comprises: the number of the aggregated carriers supported by each band among different bands.

In addition, the user equipment sends its own carrier aggregation capability to the network side, including: the user equipment sends its own carrier aggregation capability to the network side through UE capability reporting procedure; or, the user equipment sends its own carrier aggregation capability to the network side through new defined procedure of LTE-A system.

Step 702, the network side equipment acquires the carrier aggregation capability of the user equipment.

Step 703, the network side equipment configures the aggregated carriers for the user equipment according to the carrier aggregation capability thereof.

The network side equipment configures the aggregated carriers for the user equipment according to the carrier aggregation capability thereof, including one or more of the following operations: the network side equipment configures the aggregation band for the user equipment according to different aggregation bands supported; the network side equipment configures the aggregation bandwidth for the user equipment according to the aggregation bandwidth supported for continuous aggregation in the same band; the network side equipment configures the aggregation frequency for the user equipment according to the aggregation frequency supported for discontinuous aggregation in the same band; the user network side equipment configure the number of the aggregated carriers according to the number of the aggregated carriers supported.

The network side equipment acquires the carrier aggregation capability of the user equipment, which also comprises the follow-up steps: the network side equipment configures measurement gap for the user equipment according to the carrier aggregation capability thereof.

The network side equipment acquires the carrier aggregation capability of the user equipment, which also comprises the follow-up steps: the network side equipment determines the number of receivers for the user equipment according to the carrier aggregation capability thereof.

It can thus be seen that in the embodiments of the present invention, UE sends the carrier aggregation capability to the network side to enable it to acquire the carrier aggregation capability, thus ensuring normal operation of the carrier aggregation system.

In the embodiments of the present invention, the user equipment needs to send the carrier aggregation capability to the network side, such carrier aggregation capability includes but is not limited to: different aggregation bands supported; the aggregation bandwidth supported for continuous aggregation in the same band; the aggregation frequency supported for discontinuous aggregation in the same band; the number of the aggregated carriers supported; whether carrier aggregation among different bands and/or in the same band is supported.

In the practical application, the carrier aggregation capability can be sent to the network side based on the existing UE capability reporting procedure of LTE system or the existing process and RRC message can be selected optionally according to actual need; or the carrier aggregation capability can be sent to the network side based on the new process and message of LTE-A system expansion and the process and new message of this expansion also can be expanded optionally according to actual need so long as the carrier aggregation capability can be sent to the network side. It will not be described again in the embodiments of the present invention.

To more clearly explain the process of reporting the carrier aggregation capability, detailed description is given in combination with the specific embodiments below.

The embodiment II of the present invention provides a method for processing carrier aggregation capability. In this embodiment, carrier aggregation capability of inter-band (among bands) is taken as example for description.

In the carrier aggregation capability, UE supports inter-band carrier aggregation and aggregation of band1 and band3 at both its uplink and downlink; 2 carriers can be aggregated simultaneously at uplink and downlink respectively; the maximum bandwidth that can be aggregated at both uplink and downlink is 40 MHz; and then the carrier aggregation capability of this UE can cover the contents shown in Table 1.

TABLE 1

| Carrier aggregation capability | Contents |
| --- | --- |
| Downlink | The band which can aggregate with intra-band: band1 and band3 |
| | Number of carrier that can be aggregated simultaneously: 2 (or 1 for |
| | band1 and band3 respectively) |
| | Bandwidth that can be aggregated: 40 MHz (or 20 MHz for band1 |
| | and 20 MHz for band3 respectively) |
| | Whether discontinuous aggregation is supported in the same band: not |
| | supported |
| Uplink | The band which can aggregate with intra-band: band1 and band3 |
| | Number of carrier that can be aggregated simultaneously: 2 (or 1 for |
| | band1 and band3 respectively) |
| | Bandwidth that can be aggregated: 40 MHz (or 20 MHz for band1 |
| | and 20 MHz for band3 respectively) |
| | Whether discontinuous aggregation is supported in the same band: not |
| | supported |

After the carrier aggregation capability is determined, it is necessary for UE to send the carrier aggregation capability to the network side (e.g. base station).

It should be noted that, the parameters of carrier aggregation capability in Table 1 above are optional and not all them are required, which depends on the function that can be supported by UE. For function not supported by UE, corresponding parameters shall not be required.

When the base station acquires the carrier aggregation capability of UE, it can configure the carrier that can be aggregated for UE according to service demand and carrier channel quality of UE. For example, in case the downlink service of UE needs 40 MHz bandwidth for transmission while the uplink requires no carrier aggregation, UE configured by base station uses band1 and band3 for aggregation at downlink, so as to meet the requirement of 40 MHz bandwidth. And only one carrier of band 1 is configured at uplink and no carrier will be aggregated. After that, UE transmits the carrier aggregation according to configuration of network side.

It can thus be seen that in the embodiments of the present invention, UE sends the carrier aggregation capability to the network side to enable it to acquire the carrier aggregation capability, thus ensuring normal operation of the carrier aggregation system.

The embodiment III of the present invention provides a method for processing carrier aggregation capability. In this embodiment, carrier aggregation capability of intra-band (in the band) is taken as example for description.

In the carrier aggregation capability, UE supports intra-band carrier aggregation at both its uplink and downlink and supports carrier aggregation in band1 and band3 at downlink and carrier aggregation in band1 at uplink; 2 carriers can be aggregated simultaneously at uplink and downlink respectively; the maximum bandwidth that can be aggregated at downlink and uplink is 40 MHz and 20 MHz respectively; and then the carrier aggregation capability of this UE can cover the contents shown in Table 2.

The embodiment IV of the present invention provides a method for processing carrier aggregation capability. In this embodiment, carrier aggregation capability of inter-band and intra-band is taken as example for description.

In the carrier aggregation capability, UE supports inter-band and intra-band carrier aggregation, carrier aggregation of band1 and band3 and carrier aggregation in band1 and band3 at its downlink and supports intra-band aggregation and carrier aggregation in band1 and band3 at uplink. 4 carriers can be aggregated simultaneously at downlink while 2 carriers can be aggregated simulataneously at uplink. The maximum bandwidth that can be aggregated at downlink and uplink is 40 MHz and 20 MHz respectively.

For carrier aggregation both among different bands and in the same band supported, UE can send the carrier aggregation capabilities among different bands and in the same band respectively to the network side; or it can send a combination of the carrier aggregation capabilities among different bands and in the same band to the network side. Accordingly the carrier aggregation capability of this UE can cover the contents shown in Table 3 or those in Table 4.

TABLE 2

| Carrier aggregation capability | Contents |
| --- | --- |
| Downlink | The band which can aggregate with inter-band: band1 and band3<br>Number of carrier that can be aggregated simultaneously: 2 (or 2 for band1 and band3 respectively)<br>The bandwidth that can be aggregated: 40 MHz (or 40 MHz for band1 and band3 respectively)<br>Whetehr discontinuous aggregation is supported in the same band: supported (or which frequencies support, see below)<br>Which frequencies in the same band supports discontinuous aggregation: f1, f2 and other specific frequencies, or the scope of frequencies from f1 to f10, or the maximum spacing of frequencies that can be aggregated is 5 MHz, etc. |
| Uplink | The band which can aggregate with inter-band: band1<br>Number of carrier that can be aggregated simultaneously: 2 (or 2 for band1)<br>The bandwidth that can be aggregated: 20 MHz (or 20 MHz for band1)<br>Whether non-continuous aggregation is supported in the same band: not supported |

After the carrier aggregation capability is determined, it is necessary for UE to send the carrier aggregation capability to the network side (e.g. base station).

It should be noted that, the parameters of carrier aggregation capability in Table 2 above are optional and not all

TABLE 3

| Carrier aggregation capability | Contents |
| --- | --- |
| Downlink | Aggregation capability of inter-band (similar to Embodiment II) |
|  | Aggregation capability of intra-band (similar to Embodiment III) |
| Uplink | Aggregation capability of intra-band (similar to Embodiment III) |

TABLE 4

| Carrier aggregation capability | Contents |
| --- | --- |
| Downlink | The band which can aggregate with inter-band: band1 and band3 |
|  | The band which can aggregate with intra-band: band1 and band3 |
|  | Number of carrier that can be aggregated simultaneously: 2 for band1 and band3 respectively (the indirectly launched inter-band supports 4) |
|  | Bandwidth that can be aggregated: 20 MHz for band1 and band3 respectively (the indirectly launched inter-band supports 40 MHz) |
|  | Whether discontinuous aggregation is supported in the same band: not supported |
| Uplink | The band which can aggregate with intra-band: band1 and band3 |
|  | Number of carrier that can be aggregated simultaneously: 2 (or 2 for band1 and band3 respectively) |
|  | Bandwidth that can be aggregated: 20 MHz (or 20 MHz for band1 and band3 respectively) |
|  | Whether discontinuous aggregation is supported in the same band: not supported |

According to the method in Table 3 and Table 4 above, both inter-band carrier aggregation and intra-band aggregation are supported at downlink, so only when the information on intra-band aggregation and the band supported by inter-band are provided, the aggregation capability of inter-band can be inferred. And inter-band carrier aggregation is not supported at uplink, so there will be no information concerning inter-band carrier aggregation.

After the carrier aggregation capability is determined, it is necessary for UE to send the carrier aggregation capability to the network side (e.g. base station).

It should be noted that, the parameters of carrier aggregation capability in Table 3 and Table 4 above are optional and not all them are required, which depends on the function that can be supported by UE. For function not supported by UE, corresponding parameters shall not be required.

When the base station acquires the carrier aggregation capability of UE, it can configure the carrier that can be aggregated for UE according to service demand and carrier channel quality of UE. For example, in case the downlink service of UE needs 40 MHz bandwidth for transmission while the uplink requires only 20 MHz, UE configured by base station uses band1 and band3 for aggregation at downlink to meet the requirement of 40 MHz bandwidth. And UE configured at uplink is aggregated in band 1 to meet the requirement of 20 MHz bandwidth. After that, UE transmits the carrier aggregation according to configuration of network side.

It can thus be seen that in the embodiments of the present invention, UE sends the carrier aggregation capability to the network side to enable it to acquire the carrier aggregation capability, thus ensuring normal operation of the carrier aggregation system.

The embodiment V of the present invention provides a method for processing carrier aggregation capability. In this embodiment, the base station is required to configure measurement gap for UE according to the carrier aggregation capability.

After acquiring the information on the carrier aggregation capability of UE (this process can be realized through the processes of Embodiment II to Embodiment IV above, taking Embodiment II for example), the base station knows UE supports inter-band carrier aggregation according to such information and consequently infers that UE has two receivers (T/R equipment) at least. In this way, in case that UE works in band1, when measuring band3, it is necessary to open only one receiver but unnecessary to measure the gap. Accordingly, in this case, the base station cannot configure the measurement gap for UE, thus reducing data interrupt.

After acquiring the information on the carrier aggregation capability of UE (taking Embodiment III for example), the base station knows UE supports intra-band aggregation according to such information and the discontinuous carrier aggregation is supported at downlink, consequently it infers that UE has two receivers at downlink. According to intra-band aggregation frequency supported by UE, it can be learnt that the gap is not required for what frequencies at which other frequencies are measured. And when working at the former frequencies, the base station cannot configure the measurement gap for UE, thus reducing data interrupt.

In addition, it should be noted that, if the base station hopes UE to save power (more power will be consumed when more receivers are enabled), or the receiver can be turned on less frequently, thus the base station configures the gap during pilot frequency measurement of intra-band according to the information on the carrier aggregation capability of UE but not triggers UE to turn on the other receiver, so as to make UE save power. In particular, when intra-band aggregation is carried out for UE and some carriers are deactivated, the base station can better know current receiver status of UE according to the information on the carrier aggregation capability of UE.

It can thus be seen that in the embodiments of the present invention, UE sends the carrier aggregation capability to the network side to enable it to acquire the carrier aggregation capability, thus ensuring normal operation of the carrier aggregation system.

Figure 8:
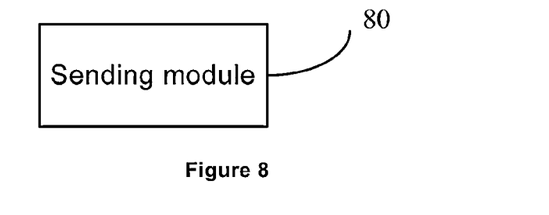
FIG. 8 is a structure diagram of a user equipment provided in the embodiments of the present invention.

Based on the inventive concepts that are the same with the aforesaid method, the embodiment of the present invention further provides a user equipment, as shown in FIG. 8, comprising:

Sending module 80 for sending its own carrier aggregation capability to the network side.

The carrier aggregation capability comprises one of the following conditions or any combination:
Different aggregation bands supported;
The aggregation bandwidth supported for continuous aggregation in the same band;
The aggregation frequency supported for discontinuous aggregation in the same band;
The number of the aggregated carriers supported;
Whether carrier aggregation among different bands and/or in the same band is supported.

The sending module 80 is specifically used for sending the carrier aggregation capability among different bands to the network side when the user equipment supports the carrier aggregation among different bands;
When the user equipment supports the carrier aggregation in the same band, send the carrier aggregation capability in same band to the network side;
When the user equipment supports the carrier aggregation among different bands and in the same band, send the carrier aggregation capabilities among different bands and in the same band to the network side respectively; or send a combination of the carrier aggregation capabilities among different bands and in the same band to the network side.

Different aggregation bands supported comprises one of the following conditions or any combination:
Whether inter-band carrier aggregation among bands is supported;
Which aggregation combination of inter-band is supported;
Bandwidth of inter-band carrier aggregation;
Carrier number of inter-band carrier aggregation.

The method for showing aggregation frequency supported for discontinuous aggregation in the same band comprises:
Specific frequency; or,
The scope of frequency; or,
Maximum spacing of frequencies that can be aggregated.

For the aggregation in the same band, the number of the aggregated carriers supported comprises:
the number of the aggregated carriers supported in each band;
For the aggregation among different bands, the number of the aggregated carrier supported comprises: the number of the aggregated carriers supported by each band among different bands.

The sending module 80 is specifically used for sending its own carrier aggregation capability to the network side through UE capability reporting procedure; or,
Send its own carrier aggregation capability to the network side through new defined procedure of LTE-A system.

Therein, each module of the device of the present invention can be integrated as a whole or arranged separately. The aforementioned modules can be merged into one module or further divided into a plurality of submodules.

It can thus be seen that in the embodiments of the present invention, UE sends the carrier aggregation capability to the network side to enable it to acquire the carrier aggregation capability, thus ensuring normal operation of the carrier aggregation system.

Figure 9:
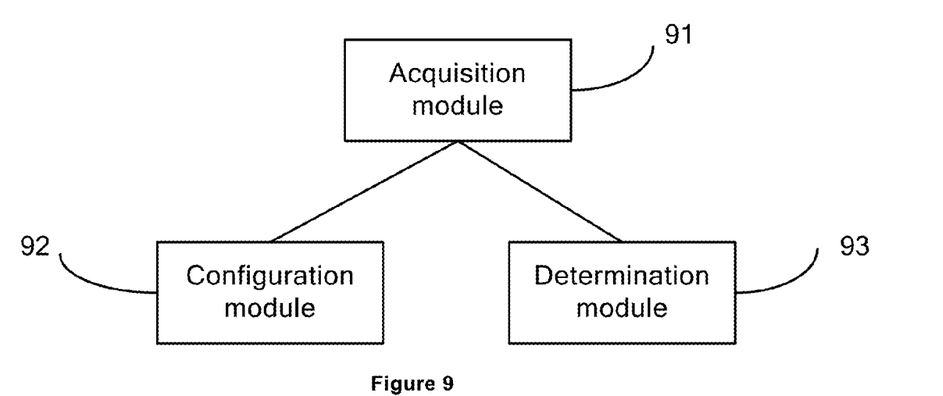
FIG. 9 is a structure diagram of an network side equipment provided in the embodiments of the present invention.

Based on the inventive concepts that are the same with the aforesaid method, the embodiment of the present invention further provides an network side equipment, as shown in FIG. 9, comprising:
Acquisition module 91 for acquiring the carrier aggregation capability of the user equipment;
Configuration module 92 for configuring the aggregated carriers for the user equipment according to the carrier aggregation capability thereof.

The carrier aggregation capability comprises one of the following conditions or any combination:
Different aggregation bands supported;
The aggregation bandwidth supported for continuous aggregation in the same band;
The aggregation frequency supported for discontinuous aggregation in the same band;
The number of the aggregated carriers supported;
Whether carrier aggregation among different bands and/or in the same band is supported.

The configuration module 92 is specifically used for one or more of the following operations:
Configure aggregation bands for the user equipment according to different aggregation bands supported;
Configure aggregation bandwidths for the user equipment according to aggregation bandwidths supported for continuous aggregation in the same band;
Configure aggregation frequencies for the user equipment according to aggregation frequencies supported for discontinuous aggregation in the same band;
Configure the number of the aggregated carriers for the user equipment according to the number of the aggregated carriers supported.

The configuration module 92 is also used for configuring the measurement gap for the user equipment according to the carrier aggregation capability thereof.
Network side equipment also comprises:
Determination module 93 for determining the number of receivers for the user equipment according to the carrier aggregation capability thereof.

Therein, all modules of the device of the present invention can be integrated as a whole or arranged separately. The aforementioned modules can be merged into one module or further divided into a plurality of submodules.

It can thus be seen that in the embodiments of the present invention, UE sends the carrier aggregation capability to the network side to enable it to acquire the carrier aggregation capability, thus ensuring normal operation of the carrier aggregation system.

With the description of the embodiments hereinabove, technical personnel of the field can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the present technology can be reflected in the form of a software product, which is saved in a memory medium comprising instructions to enable a computer equipment, which could be a personal computer, a server or a network device, to carry out the methods for each embodiment of the present invention.

Technical personnel of the field can understand that the drawings only refer to the diagram of a preferred embodiment, and the module or procedure is not necessary for the implementation of the embodiments of the present invention.

Technical personnel of the field can understand that the module in the unit of an embodiment can be distributed in such unit based on embodiment description, or located in one or more units of another embodiment through corresponding changes. Modules of the embodiments mentioned above can be merged into one module, or further divided into a plurality of submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

What is claimed is:

1. A method for processing carrier aggregation capability, comprising:
sending, by a user equipment, a carrier aggregation capability of the user equipment to a network side;
wherein the carrier aggregation capability comprises at least one of:
different aggregation bands supported by the user equipment;
an aggregation bandwidth supported by the user equipment for a continuous aggregation in one band;
aggregation frequencies supported by the user equipment for a discontinuous aggregation in one band;
a number of aggregated carriers supported by the user equipment; or
whether a carrier aggregation between different bands is supported by the user equipment and whether a carrier aggregation in one band is supported by the user equipment; and
wherein the sending, by the user equipment, the carrier aggregation capability of the user equipment to the network side comprises:
sending, by the user equipment, a carrier aggregation capability between different bands to the network side, in a case that the user equipment supports the carrier aggregation between different bands;
sending, by the user equipment, a carrier aggregation capability in one band to the network side, in a case that the user equipment supports the carrier aggregation in one band;
sending, by the user equipment, carrier aggregation capabilities between different bands and in one band to the network side respectively, or
sending, by the user equipment, a combination of carrier aggregation capabilities between different bands and in one band to the network side, in a case that the user equipment supports the carrier aggregation between different bands and the carrier aggregation in one band.

2. The method as claimed in claim 1, wherein the different aggregation bands supported by the user equipment comprise at least one of:
whether an inter-band carrier aggregation is supported;
which carrier combinations for an inter-band carrier aggregation are supported;
a bandwidth of an inter-band carrier aggregation; or
a number of carriers of an inter-band carrier aggregation.

3. The method as claimed in claim 1, wherein a way for showing aggregation frequencies supported for the discontinuous aggregation in the one band comprises:
specific frequencies; or,
a range of frequency; or,
a maximum spacing of aggregatable frequencies.

4. The method as claimed in claim 1, wherein
for the aggregation in one band, the number of the aggregated carriers supported by the user equipment comprises: the number of the aggregated carriers supported in each band;
for the aggregation between different bands, the number of the aggregated carriers supported by the user equipment comprises: the number of the aggregated carriers supported by each band of the different bands.

5. The method as claimed in claim 1, wherein the sending, by a user equipment, a carrier aggregation capability of the user equipment to a network side comprises:
sending, by the user equipment, the carrier aggregation capability of the user equipment to the network side through a UE capability reporting procedure; or,
sending, by the user equipment, the carrier aggregation capability of the user equipment to the network side through a new defined procedure of an LTE-A system.

6. A method for processing carrier aggregation capability, comprising:
acquiring, by an equipment at a network side, a carrier aggregation capability of a user equipment; and
configuring, by the equipment at the network side, aggregated carriers for the user equipment according to the carrier aggregation capability of the user equipment; and
wherein the acquiring, by the equipment at the network side, the carrier aggregation capability of the user equipment comprises:
acquiring, by the equipment at the network side, a carrier aggregation capability between different bands, in a case that the user equipment supports the carrier aggregation between different bands;
acquiring, by the equipment at the network side, a carrier aggregation capability in one band, in a case that the user equipment supports the carrier aggregation in one band;
acquiring, by the equipment side, carrier aggregation capabilities between different bands and in one band respectively, or
acquiring, by the equipment at the network side, a combination of carrier aggregation capabilities between different bands and in one band, in a case that the user equipment supports the carrier aggregation between different bands and the carrier aggregation in one band.

7. The method as claimed in claim 6, wherein the carrier aggregation capability comprises at least one of:
different aggregation bands supported by the user equipment;
an aggregation bandwidth supported by the user equipment for a continuous aggregation in the one band;
aggregation frequencies supported by the user equipment for a discontinuous aggregation in one band;
a number of aggregated carriers supported by the user equipment; or
whether a carrier aggregation between different bands is supported by the user equipment and whether a carrier aggregation in one band is supported.

8. The method as claimed in claim 7, wherein the configuring, by the equipment at the network side, aggregated carriers for the user equipment according to the carrier aggregation capability of the user equipment comprise at least one:

configuring, by the equipment at the network side, aggregation bands for the user equipment according to the different aggregation bands supported by the user equipment;

configuring, by the equipment at the network side, an aggregation bandwidth for the user equipment according to the aggregation bandwidth supported by the user equipment for the continuous aggregation in one band;

configuring, by the equipment at the network side, aggregation frequencies for the user equipment according to the aggregation frequencies supported by the user equipment for the discontinuous aggregation in one band; or configuring, by the equipment at the network side, the number of aggregated carriers for the user equipment according to the number of the aggregated carriers supported by the user equipment.

9. The method as claimed in claim 6, wherein after the acquiring, by an equipment at a network side, a carrier aggregation capability of a user equipment, the method further comprises:

configuring, by the equipment at the network side, a measurement gap for the user equipment according to the carrier aggregation capability of the user equipment.

10. The method as claimed in claim 6, wherein after the acquiring, by an equipment at a network side, a carrier aggregation capability of a user equipment, the method further comprises:

determining, by the equipment at the network side, a number of receivers for the user equipment according to the carrier aggregation capability of the user equipment.

11. A user equipment, comprising a computer processor and a computer-readable storage medium which stores a plurality of computer-executable instructions, wherein the computer-executable instructions, when being executed by the computer processor, cause the computer processor to:

send a carrier aggregation capability of the user equipment to a network side;

wherein the carrier aggregation capability comprises at least one of:
different aggregation bands supported by the user equipment;
an aggregation bandwidth supported by the user equipment for a continuous aggregation in one band;
aggregation frequencies supported by the user equipment for a discontinuous aggregation in one band;
a number of aggregated carriers supported by the user equipment; or
whether a carrier aggregation between different bands is supported by the user equipment and whether a carrier aggregation in one band is supported by the user equipment; and wherein the computer-executable instructions, when being executed by the computer processor, cause the computer processor to
send a carrier aggregation capability between different bands to the network side in a case that the user equipment supports the carrier aggregation between different bands;
send a carrier aggregation capability in one band to the network side in a case that the user equipment supports the carrier aggregation in one band;
send carrier aggregation capabilities between different bands and in one band to the network side respectively, or send a combination of carrier aggregation capabilities between different bands and in one band to the network side; in a case that the user equipment supports the carrier aggregation between different bands and the carrier aggregation in one band.

12. The user equipment as claimed in claim 11, wherein the different aggregation bands supported by the user equipment comprise at least one of: whether an inter-band carrier aggregation is supported; which carrier combinations for an inter-band aggregation combination are supported; a bandwidth of an inter-band carrier aggregation; or a number of carriers of an inter-band carrier aggregation;

a way for showing aggregation frequencies supported for the discontinuous aggregation in one band includes: specific frequencies; or, a range of frequency; or, a maximum spacing of aggregatable frequencies; and for the aggregation in one band, the number of the aggregated carriers supported by the user equipment comprises: the number of the aggregated carriers supported in each band; and for the aggregation between different bands, the number of the aggregated carriers supported by the user equipment comprises: the number of the aggregated carriers supported by each band of the different bands.

13. The user equipment as claimed in claim 11, wherein the computer-executable instructions, when being executed by the computer processor, cause the computer processor to send the carrier aggregation capability of the user equipment to the network side through a UE capability reporting procedure; or, send the carrier aggregation capability of the user equipment to the network side through a new defined procedure of an LTE-A system.

* * * * *